(12) United States Patent
Hayasaka

(10) Patent No.: US 10,043,290 B2
(45) Date of Patent: Aug. 7, 2018

(54) IMAGE PROCESSING TO ENHANCE DISTANCE CALCULATION ACCURACY

(71) Applicant: SONY CORPORATION, Tokyo (JP)

(72) Inventor: Kengo Hayasaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/430,702

(22) Filed: Feb. 13, 2017

(65) Prior Publication Data

US 2017/0221228 A1    Aug. 3, 2017

Related U.S. Application Data

(63) Continuation of application No. 14/408,056, filed as application No. PCT/JP2013/003994 on Jun. 26, 2013, now Pat. No. 9,715,734.

(30) Foreign Application Priority Data

Jun. 28, 2012    (JP) .................... 2012-145036

(51) Int. Cl.
*G06K 9/00* (2006.01)
*G06T 7/00* (2017.01)
(Continued)

(52) U.S. Cl.
CPC ............. *G06T 7/97* (2017.01); *G01B 11/14* (2013.01); *G06T 7/70* (2017.01); *H04N 5/247* (2013.01); *G06T 2207/10016* (2013.01)

(58) Field of Classification Search
USPC ....... 382/100, 103, 106–107, 153, 162, 168, 382/173, 181, 190–194, 199, 209, 219,
(Continued)

(56) References Cited

U.S. PATENT DOCUMENTS

2006/0056727 A1* 3/2006 Jones ................... G06K 9/32
382/276
2010/0277571 A1* 11/2010 Xu ........................ G06T 17/00
348/47
(Continued)

FOREIGN PATENT DOCUMENTS

JP    2006-091011 A    4/2006
JP    2010-139288 A    6/2010
(Continued)

OTHER PUBLICATIONS

Notice of Allowance for U.S. Appl. No. 14/408,056 dated Apr. 3, 2017.
(Continued)

*Primary Examiner* — Seyed Azarian
(74) *Attorney, Agent, or Firm* — Chip Law Group

(57) ABSTRACT

There is provided an image processing apparatus including a distance information generation portion configured to generate first distance information about an object to be measured based on a phase difference between images provided by a plurality of first cameras having a first base length, and generate second distance information about the object to be measured based on a phase difference between images provided by a plurality of second cameras having a second base length that is different from the first base length; and a distance extraction portion configured to extract distance information from an imaging position and the object to be measured based on the first distance information and the second distance information.

18 Claims, 11 Drawing Sheets

(51) Int. Cl.
  *G06T 7/70* (2017.01)
  *H04N 5/247* (2006.01)
  *G01B 11/14* (2006.01)
  *H04N 13/02* (2006.01)

(58) Field of Classification Search
  USPC ............... 382/232, 254–255, 266, 274, 276, 382/285–291, 305, 312; 348/43, 46, 47
  See application file for complete search history.

(56) References Cited

U.S. PATENT DOCUMENTS

| | | | | |
|---|---|---|---|---|
| 2011/0199458 A1* | 8/2011 | Hayasaka | ............... | G06T 7/593 348/43 |
| 2012/0162374 A1* | 6/2012 | Markas | ............. | H04N 13/0022 348/46 |
| 2013/0101160 A1* | 4/2013 | Woodfill | .................. | G06K 9/32 382/103 |

FOREIGN PATENT DOCUMENTS

| | | |
|---|---|---|
| JP | 2011-171858 A | 9/2011 |
| JP | 2011-203238 A | 10/2011 |

OTHER PUBLICATIONS

Amtoun, et al., "Multi-Baseline Stereo Using a Single-Lens Camera", Proceedings of 2003 International Conference on Image Processing, vol. 1, Jan. 1, 2003, pp. 401-404.

Jenkin, et al., "Techniques for Disparity Measurement," CVGIP: Image Understanding, vol. 53, No. 1, Jan. 1, 1991, pp. 14-30.

Okutomi, et al., "A Multiple-Baseline Stereo," Proceedings of The Computer Society Conference on Computer Vision and Pattern Recognition, Lahaina, Maui, Hawaii, Jun. 3-6, 1991; Proceedings of The Computer Society Conference on Computer Vision and Pattern Recognition, Los Alamitos, IEEE Comp, vol. 3, Jun. 3, 1991, pp. 63-69.

Adelson, et al, "Single Lens Stereo With a Plenoptic Camera," Transactions on Pattern Analysis and Machine Intelligence, IEEE, Piscataway, USA, vol. 14, No. 2, Feb. 1, 1992, pp. 99-106.

Ng, et al, "Light Field Photography with a Hand-held Plenoptic Camera," Standford Tech Report CTSR, Feb. 1, 2005, pp. 1-11.

Office Action for Japanese Patent Application No. 2012-145036, dated Feb. 2, 2016, 04 pages.

* cited by examiner

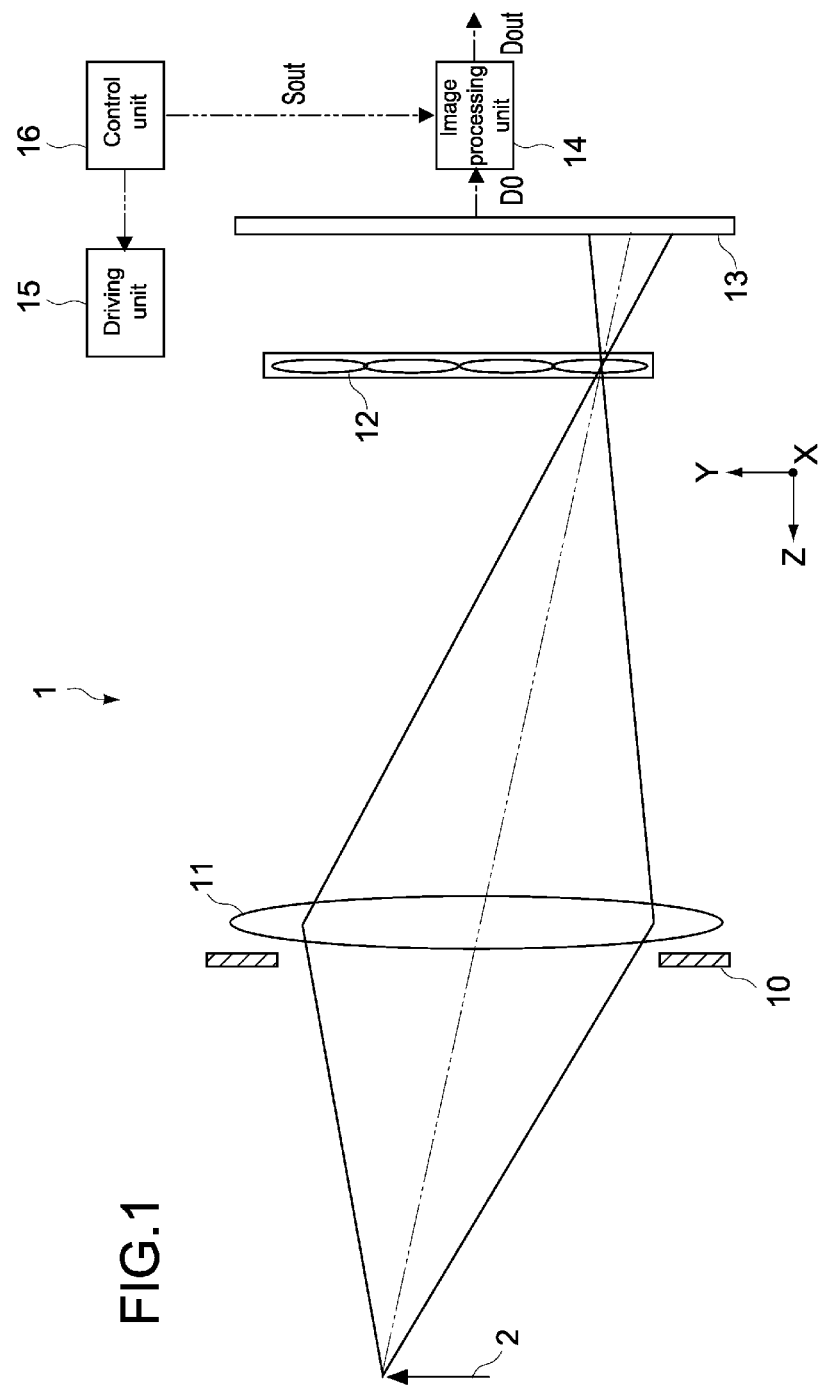

FIG.9A
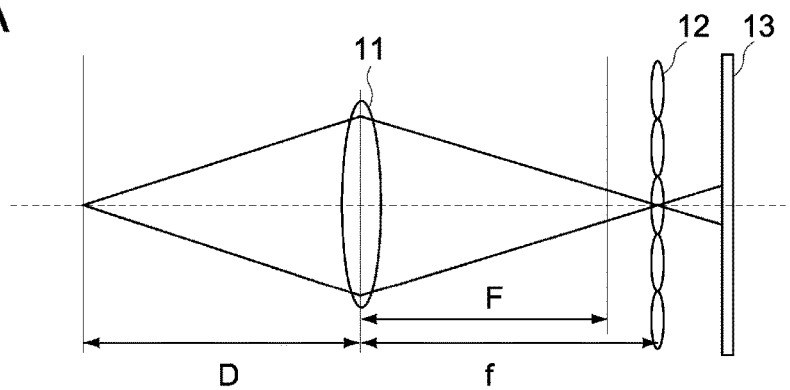
FIG.9B
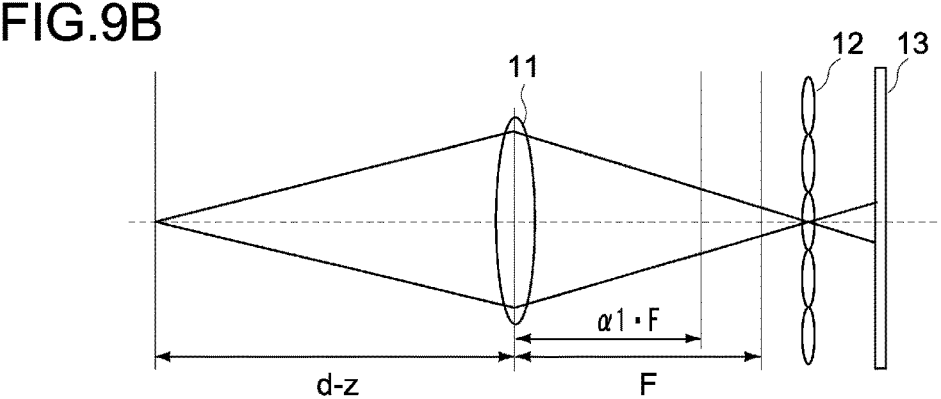
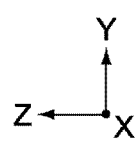

FIG.10
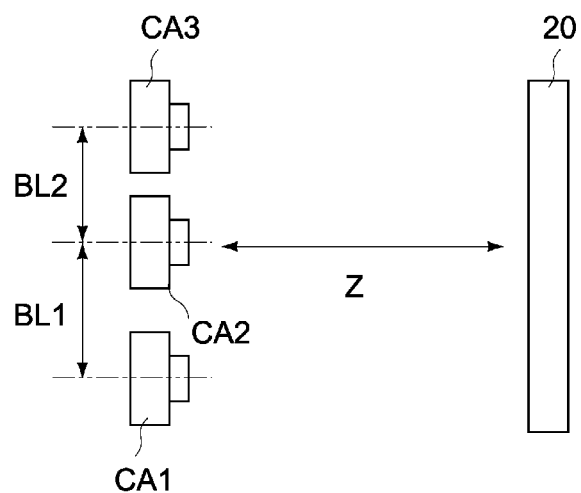
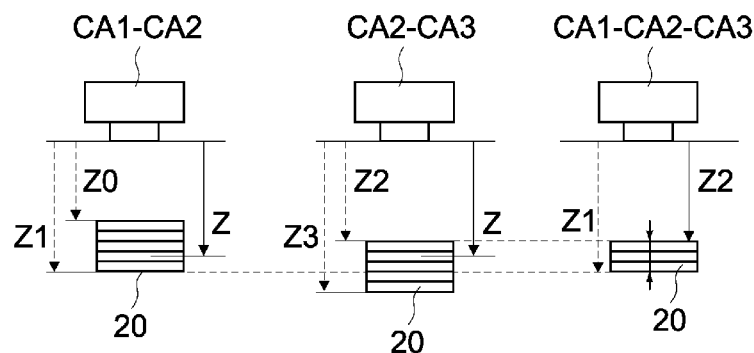
FIG.11A  FIG.11B  FIG.11C

FIG.12
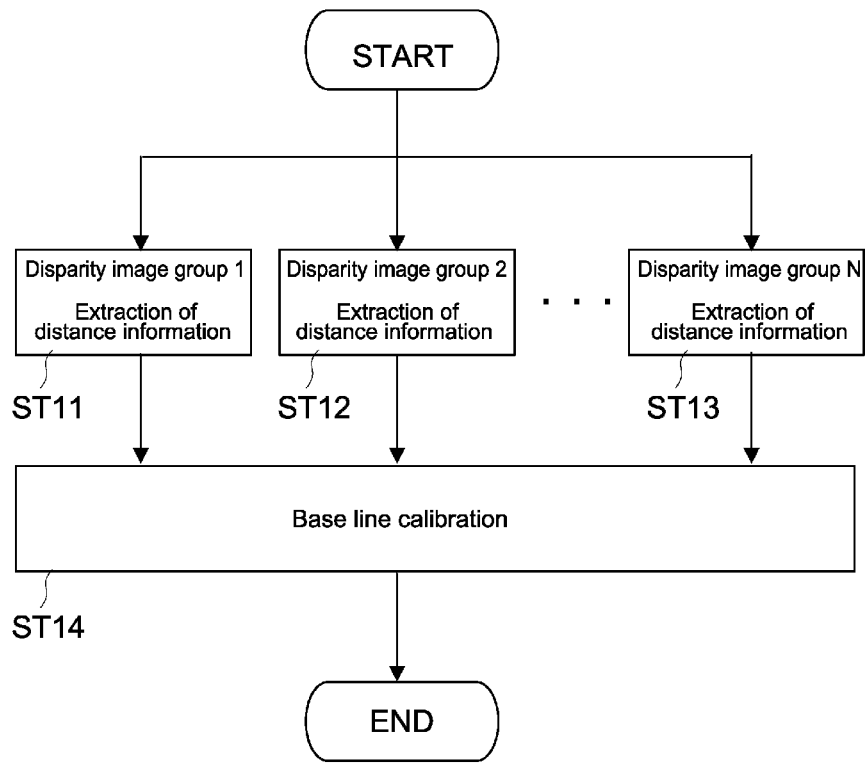
FIG.13
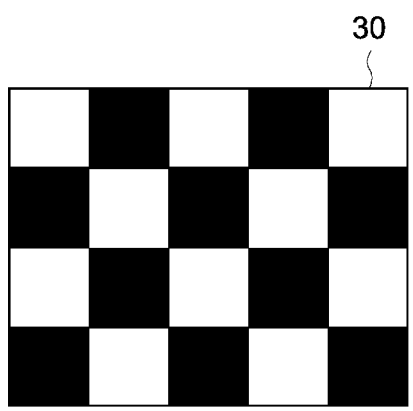
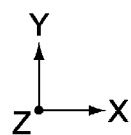

IMAGE PROCESSING TO ENHANCE DISTANCE CALCULATION ACCURACY

CROSS REFERENCE TO RELATED APPLICATIONS

The present application is a continuation application of U.S. patent application Ser. No. 14/408,056, filed Dec. 15, 2014, which is a national stage entry of PCT application PCT/JP2013/003994 filed Jun. 26, 2013 and which claims the benefit of Japanese Priority Patent Application 2012-145036 filed Jun. 28, 2012, the entire contents of which are incorporated herein by reference.

TECHNICAL FIELD

The present disclosure relates to an image processing apparatus, an imaging apparatus, and an image processing method of being capable of providing distance information about an object to be measured.

BACKGROUND ART

In general, there is known a technology for measuring a distance to an object to be measured using a plurality of images with different view points. For example, Citation 1 describes a distance calculation method using a technique being referred to as stereo matching.

In such a stereo matching technology, a distance is calculated from a plurality of disparity images along a horizontal (H direction) or a vertical direction (V direction) within the images by determining a phase difference between the disparity images. The phase difference is determined by sequentially moving local areas (unit areas) of objects to be compared in a horizontal direction, and detecting a position offset (pixel offset) between the disparity images having most correlated unit areas within a comparison range. Also, it is possible to calculate the distance from the plurality of disparity images along a direction at any angle within the images.

CITATION LIST

Patent Literature

[PTL 1]
Japanese Patent Application Laid-open No. 2011-171858

SUMMARY

Technical Problem

In the stereo matching, measurement accuracy of a phase difference between disparity images depends on a distance between an object and a camera. In other words, the longer the distance between the object and the camera is, the lower the measurement accuracy of the phase difference is. A camera noise, disturbance or the like affects thereon. As a result, distance calculation accuracy is also lowered.

In view of the circumstances as described above, it is desirable to provide an image processing apparatus, an imaging apparatus, and an image processing method of being capable of enhancing distance calculation accuracy.

Solution to Problem

According to an embodiment, an image processing apparatus is provided including a distance information generation portion configured to generate first distance information about an object to be measured based on a phase difference between images provided by a plurality of first cameras having a first base length, and generate second distance information about the object to be measured based on a phase difference between images provided by a plurality of second cameras having a second base length that is different from the first base length; and a distance extraction portion configured to extract distance information from an imaging position and the object to be measured based on the first distance information and the second distance information.

In another embodiment, an imaging apparatus includes an image sensor; and an image processing apparatus including a distance information generation portion configured to generate first distance information about an object to be measured based on a phase difference between images provided by a plurality of first cameras having a first base length, and generate second distance information about the object to be measured based on a phase difference between images provided by a plurality of second cameras having a second base length that is different from the first base length, and a distance extraction portion configured to extract distance information from an imaging position of the image sensor and the object to be measured based on the first distance information and the second distance information.

In another embodiment, an image processing method is provided and includes generating first distance information about an object to be measured based on a phase difference between images provided by a plurality of first cameras having a first base length; generating second distance information about the object to be measured based on a phase difference between images provided by a plurality of second cameras having a second base length that is different from the first base length; and extracting distance information from an imaging position and the object to be measured based on the first distance information and the second distance information.

According to an embodiment of the present technology, there is provided an image processing apparatus including a distance information generation portion and a distance extraction portion.

The distance information generation portion generates first distance information about an object to be measured based on a phase difference between images provided by a camera having a first base length, and second distance information about the object to be measured based on a phase difference between images provided by a camera having a second base length being different from the first base length.

The distance extraction portion extracts a distance between an imaging position to the object to be measured based on the first and second distance information.

According to the image processing apparatus, the distance to the object to be measured is calculated based on the images provided by the plurality of cameras having base lengths being different each other, whereby distance accuracy of the object to be measured can be enhanced.

The distance extraction portion extracts a distance to the object to be measured within a mutually overlapped distance range in a first distance range extracted from the first distance information and a second distance range extracted from the second distance information. This can increase the measurement accuracy of the distance to the object to be measured.

The image processing apparatus may further include a memory part for storing the first and second base lengths.

This can measure the distance to the object to be measured based on the base lengths corresponding to respective imaging apparatuses.

The distance information generation portion may further generate third distance information about the object to be measured based on a phase difference between images provided by a camera having a third base length being different from the first and the second base lengths. In this case, the distance extraction portion extracts a distance between the imaging position and the object to be measured based on the first, second, and third distance information. This can further enhance the distance accuracy of the object to be measured.

According to an embodiment of the present technology, there is provided an imaging apparatus including an imaging unit, a distance information generation portion, and a distance extraction portion.

The imaging unit includes a plurality of cameras arranged in a uniaxial direction.

The distance information generation portion generates first distance information about an object to be measured based on a phase difference between images provided by a camera having a first base length, and second distance information about the object to be measured based on a phase difference between images provided by a camera having a second base length being different from the first base length.

The distance extraction portion extracts a distance between an imaging position and the object to be measured based on the first and second distance information.

According to the image processing apparatus, the distance to the object to be measured is calculated based on the images provided by the plurality of cameras having base lengths being different each other, whereby distance accuracy of the object to be measured can be enhanced.

The imaging unit may include an imaging lens having an aperture stop, an image sensor for providing captured data based on a received light, and a plurality of microlenses disposed corresponding to a plurality of pixels in one area of the image sensor.

This can provide a plurality of disparity images having different base lengths.

According to an embodiment of the present technology, there is provided an image processing method including producing first distance information about an object to be measured based on a phase difference between images provided by a camera having a first base length.

In addition, the image processing method includes producing second distance information about the object to be measured based on a phase difference between images provided by a camera having a second base length being different from the first base length.

Based on the first and second distance information, a distance from an imaging position to an object to be measured is extracted.

According to the image processing method, the distance to the object to be measured is calculated based on the images provided by the plurality of cameras having base lengths being different each other, whereby distance accuracy of the object to be measured can be enhanced.

As described above, according to embodiments of the present technology, the distance calculation accuracy of the object to be measured can be enhanced.

BRIEF DESCRIPTION OF DRAWINGS

FIG. 1 is a schematic configuration diagram of an imaging apparatus according to an embodiment of the present technology.

FIGS. 9A and 9B are schematic diagrams of illustrating a relationship between distance information and a refocus coefficient.

FIG. 10 is a schematic diagram of illustrating a distance calculation operation in the image processing unit.

FIGS. 11A-11C are schematic diagrams of illustrating a distance calculation operation in the image processing unit.

FIG. 12 is a flow chart of illustrating a distance calculation operation in the image processing unit.

FIG. 13 is a schematic diagram of the object to be measured of illustrating a method of measuring a base length in the image processing unit.

DESCRIPTION OF EMBODIMENTS

Figure 2A:
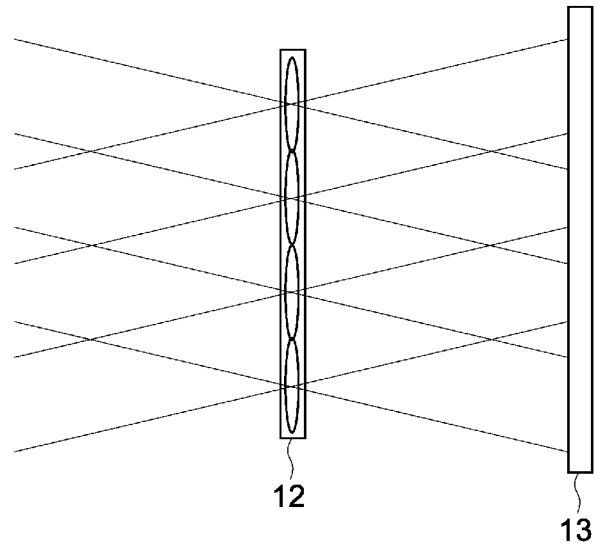
FIGS. 2A and 2B are schematic diagram of illustrating an F number of a microlens array.

Hereinafter, embodiments of the present technology will be described with reference to the drawings.

FIG. 1 is a schematic diagram of showing an overall configuration of an imaging apparatus according to an embodiment of the present technology. The imaging apparatus 1 captures an object to be imaged (subject) 2, implements a predetermined image processing, and generates and outputs an image data (captured data) Dout.

(Overall Configuration)

The imaging apparatus 1 includes an imaging lens 11 having an aperture stop 10, a microlens array 12, an image sensor 13, an image processing unit 14, an image sensor driving unit 15, and a control unit 16.

In the imaging apparatus 1, the captured data provided by the image sensor 13 includes not only a light intensity map in a light receiving surface but also information about a light moving direction. The imaging apparatus 1 is configured to be capable of reconstructing an observed image from an arbitrary focal point or a view point in the image processing unit 14.

The image processing method according to the embodiment is embodied in the image processing unit 14. The imaging apparatus 1 and the image processing method will be described together. In addition, an image processing program according to the embodiment corresponds to software for each image processing function in the image processing unit 14. In this case, the software is configured by a group of programs to make the computer to execute each image processing function. For example, each program may be incorporated in a dedicated hardware in advance. Alternatively, the program may be installed on a general-purpose personal computer via a network or a recording medium.

The aperture stop 10 is an optical aperture stop of the imaging lens 11. An image (a unit image as described later) of the object to be imaged 2 has a shape similar to a shape (e.g., a circle shape) of the aperture stop 10, and is formed on the image sensor 13 per microlens. The plurality of microlenses and the light receiving area of the image sensor 13 where light is emitted from the microlens configure a plurality of camera units two-dimensionally disposed.

The imaging lens 11 is a main lens for capturing the object to be imaged 2, and is, for example, configured of a general imaging lens used in a video camera, a still camera and the like.

The microlens array 12 includes a plurality of microlenses two-dimensionally arranged in a horizontal direction (an X axis direction) and a vertical direction (a Y axis direction), and is disposed at a focal point surface (image forming surface) of the imaging lens 11. Each microlens has, for example, a circle flat shape.

Figure 2B:
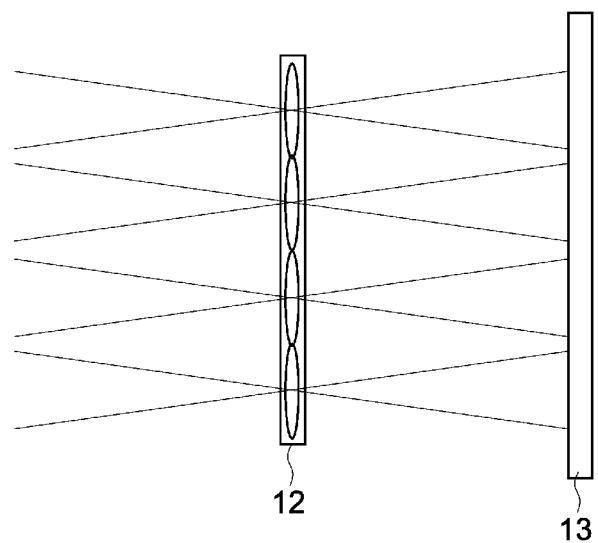

It is desirable that an F number FML of the imaging lens 11 and an F number FMLA of the microlens array 12 are the almost same. If the F number FML of the imaging lens 11 is smaller than the F number FMLA of the microlens array 12 (FML<FMLA) as shown in FIG. 2A, imaging light beams may be overlapped due to adjacent microlenses. In this case, a cross talk may be generated, and a reconstruction image may have poor image quality. On the other hand, if the F number FML of the imaging lens 11 is larger than the F number FMLA of the microlens array 12 (FML>FMLA) as shown in FIG. 2B, the microlens may have imaging pixels on which the imaging light beams are not received. In this case, the imaging pixels cannot be fully utilized, and the number of pixels in the reconstruction image may be decreased.

The image sensor 13 receives the light beams from the microlens array 12 to provide a captured data D0 including a plurality of pixel data, and is disposed at a focal point surface (image forming surface). The image sensor 13 is configured by two-dimensional solid-state image sensor including a plurality of CCD (Charge Coupled Device) or CMOS (Complementary Metal-Oxide Semiconductor) arranged in a matrix in a horizontal direction (an X axis direction) and a vertical direction (a Y axis direction).

On the light receiving surface of the image sensor 13 (on a surface at the microlens array 12), M×N (each of M and N is an integer) image sensors (hereinafter referred to simply as a "pixel") are arrange in a matrix. To the plurality of pixels, one microlens in the microlens array 12 is allocated and disposed. In other words, the plurality of microlenses is disposed corresponding to the plurality of pixels in one area of the image sensor 13.

For example, the number of pixels on the light receiving surface is M×N=3720×2520=9374400. One microlens is allocated to 144 pixels (m×n=12×12=144) among them.

The number of pixels (M×N) of the reconstruction image becomes equal to the number of lenses in the microlens array. This is because the information about a two-dimensional coordinate of the reconstruction image is determined by a coordinate of the microlens array. Accordingly, the number of pixels in the reconstruction image is provided by dividing the number of total pixels in the image sensor 13 by the number of pixels (m×n) allocated to each microlens.

The number of the pixels (m×n) allocated to each microlens is equals to angular resolving power of the light beam. As its value increases, the resolving power of the reconstruction image, e.g., the resolving power in an arbitrary field of view, or the resolving power (at an arbitrary focal point) in a depth direction based on a refocus arithmetic processing becomes higher. On the other hand, the number of pixels ((M/m)×(N/n)) of the reconstruction image is concerned with the resolution of the reconstruction image. As its value increases, the resolution of the reconstruction image becomes higher. Thus, there is a trade-off relationship between the resolving power and the resolution of the reconstruction image. It is desirable that both of the resolving power and the resolution have higher values as much as possible.

On the light receiving surface of the image sensor 13, a color filter not shown may be two-dimensionally disposed per pixel. As the color filter, a Bayer arrangement color filter (primary color filter) where a color filter including three primary colors of red (R), green (G) and blue (B) is disposed in a checker board pattern at a ratio of R:G:B=1:2:1. By disposing the color filter, the captured data provided by the image sensor 13 can be the pixel data having a plurality of colors (in this case, three primary colors) corresponding to the color filter.

The image processing unit 14 generates an image data Dout by implementing a predetermined image processing described later to the captured data D0 provided by the image sensor 13. A detailed configuration of the image processing unit 14 will be described later.

The image sensor driving unit 15 drives the image sensor 13, and controls its light receiving operation.

The control unit 16 controls operations of the image processing unit 14 and the image sensor driving unit 15. The operation of the image processing unit 14 is controlled using a control signal Sout. The control unit 16 may be configured, for example, with a microcomputer.

(Image Processing Unit)

Figure 3:
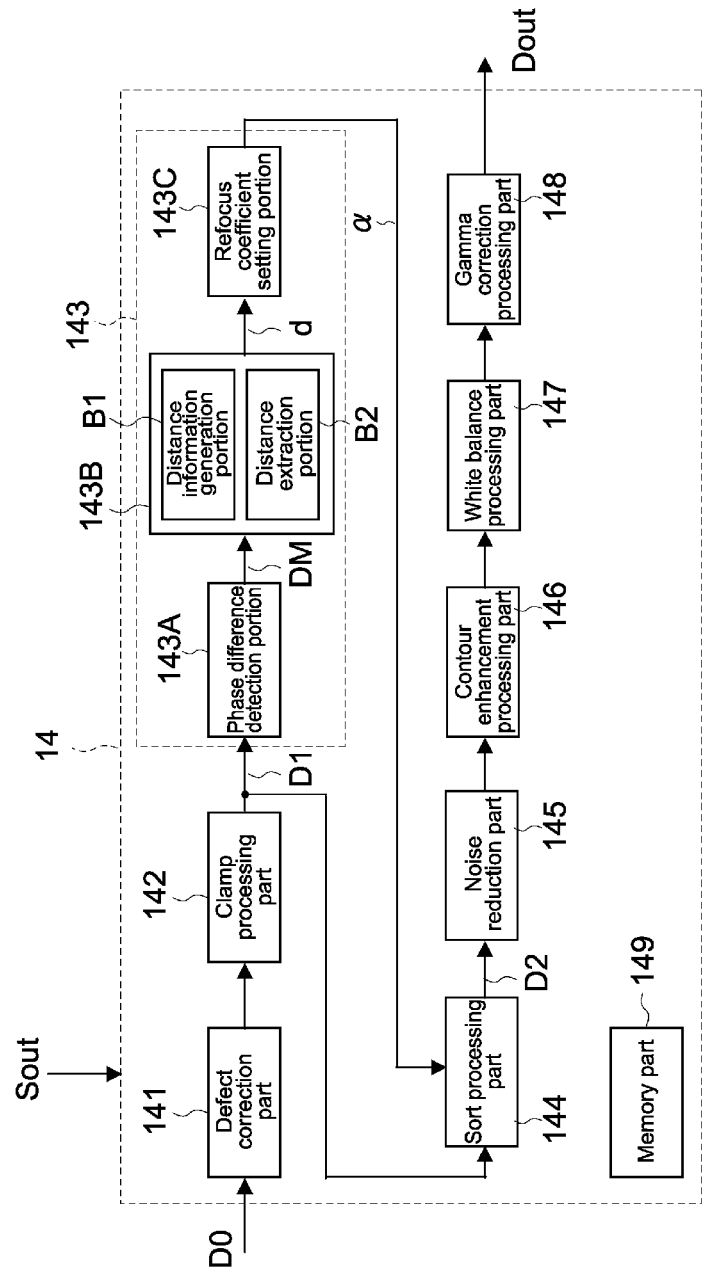
FIG. 3 is a functional block diagram of showing a schematic configuration of an image processing unit shown in FIG. 1.

Next, referring to FIG. 3, the detailed configuration of the image processing unit 14 will be described. FIG. 3 shows a functional block configuration of the image processing unit 14. The image processing unit 14 includes a defect correction part 141, a clamp processing part 142, a distance information providing part 143, a sort processing part 144, a noise reduction part 145, a contour enhancement processing part 146, a white balance processing part 147, a gamma correction processing part 148, and a memory part 149.

The defect correction part 141 corrects a defect (attributed to abnormality of the image sensor 13 itself) such as an under exposure contained in the captured data D0.

The clamp processing part 142 sets (clamps) a black level in each pixel data of the captured data after the defect correction by the defect correction part 141. After the clamp processing, the captured data may be further color-interpolated, such as by pixelization.

The distance information providing part 143 calculates a refocus coefficient alpha that is used for a sort processing in the sort processing part 144 as described later based on the captured data D1 provided by the clamp processing part 142. The refocus coefficient alpha is calculated using a depth of a designated captured image corresponding to the captured data D1 as a refocus surface.

The distance information providing part 143 includes a phase difference detection portion 143A, a distance information calculation portion 143B and a refocus coefficient setting portion 143C.

The phase difference detection portion 143A generates (calculates) a phase difference map (Disparity Map as described later) DM based on the captured data D1.

The distance information calculation portion 143B calculates from distance information d as described later (distance information from an imaging position (the imaging lens 11) to the object to be measured (for example, to the refocus surface)) based on the phase difference map DM. The distance information calculation portion 143B includes a distance information generation portion B1 and a distance extraction portion B2.

The distance information generation portion B1 generates first distance information about an object to be measured based on a phase difference between images provided by a camera having a first base length in a uniaxial direction, and second distance information about the object to be measured based on a phase difference between images provided by a camera having a second base length in a uniaxial direction being different from the first base length, as described later.

The distance extraction portion B2 extracts distance information D from the imaging position and the object to be measured based on the above-described first distance information and the second distance information, as described later.

The refocus coefficient setting portion 143C sets (calculates) the refocus coefficient alpha based on the distance information d. A detailed operation of the distance information providing part 143 will be described later.

The sort processing part 144 implements a predetermined sort processing of the captured data D1 provided by the clamp processing part 142 using the refocus coefficient alpha calculated on the refocus coefficient setting part 143C to generate image data D2. The sort processing includes, for example, a refocus arithmetic processing using a technique being referred to as "Light Field Photography".

The noise reduction part 145 reduces a noise (generated when the image is captured at a dark or less sensitive location) contained in the image data D2 provided by the sort processing part 144.

The contour enhancement processing part 146 enhances a contour of a moving image in the image data provided by the noise reduction processing part 145.

The white balance processing part 147 adjusts a color balance (a white balance) of the image data provided by the contour enhancement processing part 146, the color balance being influenced by individual differences of the devices such as a light pass characteristic of a color filter and spectral sensitivity of the image sensor 13, and lighting conditions.

The gamma correction processing part 148 implements a predetermined gamma correction (light-dark or contrast correction) of the image data provided by the white balance processing part 147 to generate the image data Dout.

The memory part 149 is configured by, for example, a ROM (Read Only Memory) or a RAM (Random Access Memory), and stores programs and parameters necessary for calculation of each unit constituting the image processing unit 14. The memory part 149 may be contained in the control unit 16. The memory part 149 may be configured separately from the image processing unit 14 and the control unit 16. In this case, the memory part 149 is controlled by the image processing unit 14 or the control unit 16. The memory part 149 may be configured as an external memory apparatus such as a hard disk drive.

(Operation of Imaging Apparatus)

Subsequently, the image processing unit 14 will be described in detail together with an action of the imaging apparatus 1 according to the embodiment.

(Basic Action)

In the imaging apparatus 1, the image of the object to be imaged 2 is formed on the microlens array 12 through the imaging lens 11, as shown in FIG. 1. An incident light to the microlens array 12 is received on the image sensor 13 through the microlens array 12.

Figure 4:
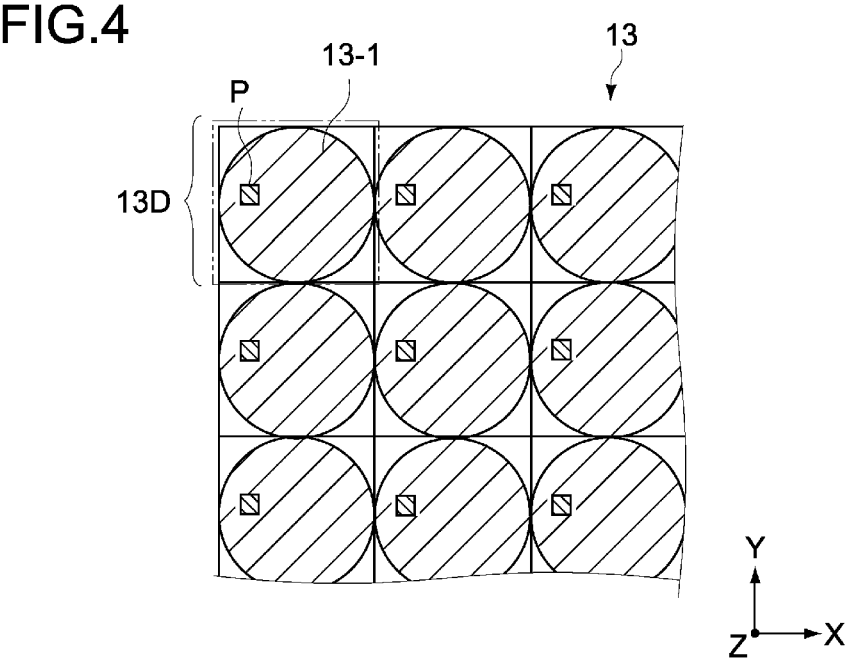
FIG. 4 is a plan view of showing a light receiving area on an image sensor shown in FIG. 1.

The incident light to the microlens array 12 is received on different positions of the image sensor 13 depending on a traveling direction. As a result, an image (unit image) 13-1 of the object to be imaged 2 that has a similar shape to an opening shape of the aperture stop 10, as shown in FIG. 4 is formed per the microlens. An area (a reconstruction pixel area 13D) constituted by a pixel P allocated to one microlens corresponds to one pixel of the image reconstructed.

Figure 5:
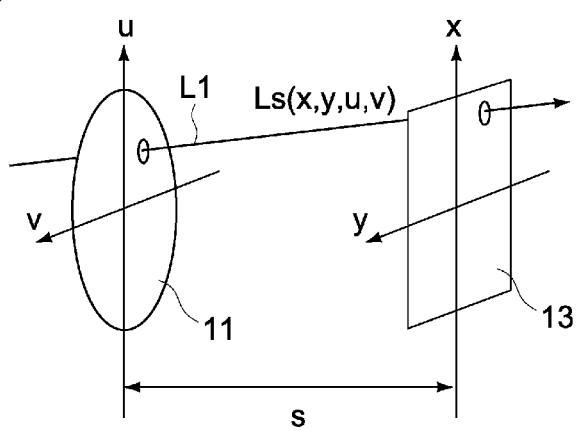
FIG. 5 is a schematic diagram of illustrating a light beam received on the image sensor.

Herein, referring to FIG. 5, the light beam received on the image sensor 13 will be described. As shown FIG. 5, it is supposed that there are an orthogonal coordinate system (u, v) on the surface of the imaging lens 11 and an orthogonal coordinate system (x, y) on the imaging surface of the image sensor 13, and a distance between the surface of the imaging lens 11 and the imaging surface of the image sensor 13 is s. Then, a light beam L1 passing through the imaging lens 11 and the image sensor 13 is represented by a four dimensional function Ls (x, y, u, v). Therefore, position information of the light beam is stored in the image sensor 13, while the traveling direction of the light beam is held. In other words, a position of a plurality of pixels P allocated to each microlens will determine an incident direction of the light beam.

In this way, once the light is received on the image sensor 13, the image sensor driving unit 15 is driven to provide the captured data D0, which is input to the image processing unit 14. Then, the image processing unit 14 implements a predetermined image processing described later to the captured data D0, whereby the imaging apparatus 1 generates the image data Dout and outputs it externally.

(Typical Action of Imaging Processing Unit)

Next, referring to FIGS. 3, 6, 7, 8, 9A and 9B, a typical image processing action in the image processing unit 14 will be described.

As shown in FIG. 3, in the image processing unit 14, the defect correction part 141 corrects any defects of the captured data D0, and the clamp processing part 142 clamps the captured data after any defects thereof are corrected. This allows the captured data D1 after the cramp processing to be input to the distance information providing part 143.

Then, the distance information providing part 143 calculates the refocus coefficient alpha based on the captured data D1, as described later.

Firstly, a phase difference detection portion 143A generates a plurality (for example, three or more) of disparity images (arbitrary viewpoint images at different view points) based on the captured data D1. The disparity images for detecting the phase difference can be generated by extracting and combining pixel data provided on the pixels P that are disposed at the same positions between the unit images received on the image sensor 13. Thus, the numbers of the disparity image generated are equal to those of the pixels allocated on one microlens.

Then, the phase difference detection portion 143A calculates correlation values, which will be described later, in the plurality of disparity images generated, detects phase differences between the disparity images, and generates the phase difference map (Disparity Map) DM that shows phase differences per unit area (for example, per pixel P) within the image.

Figure 6:
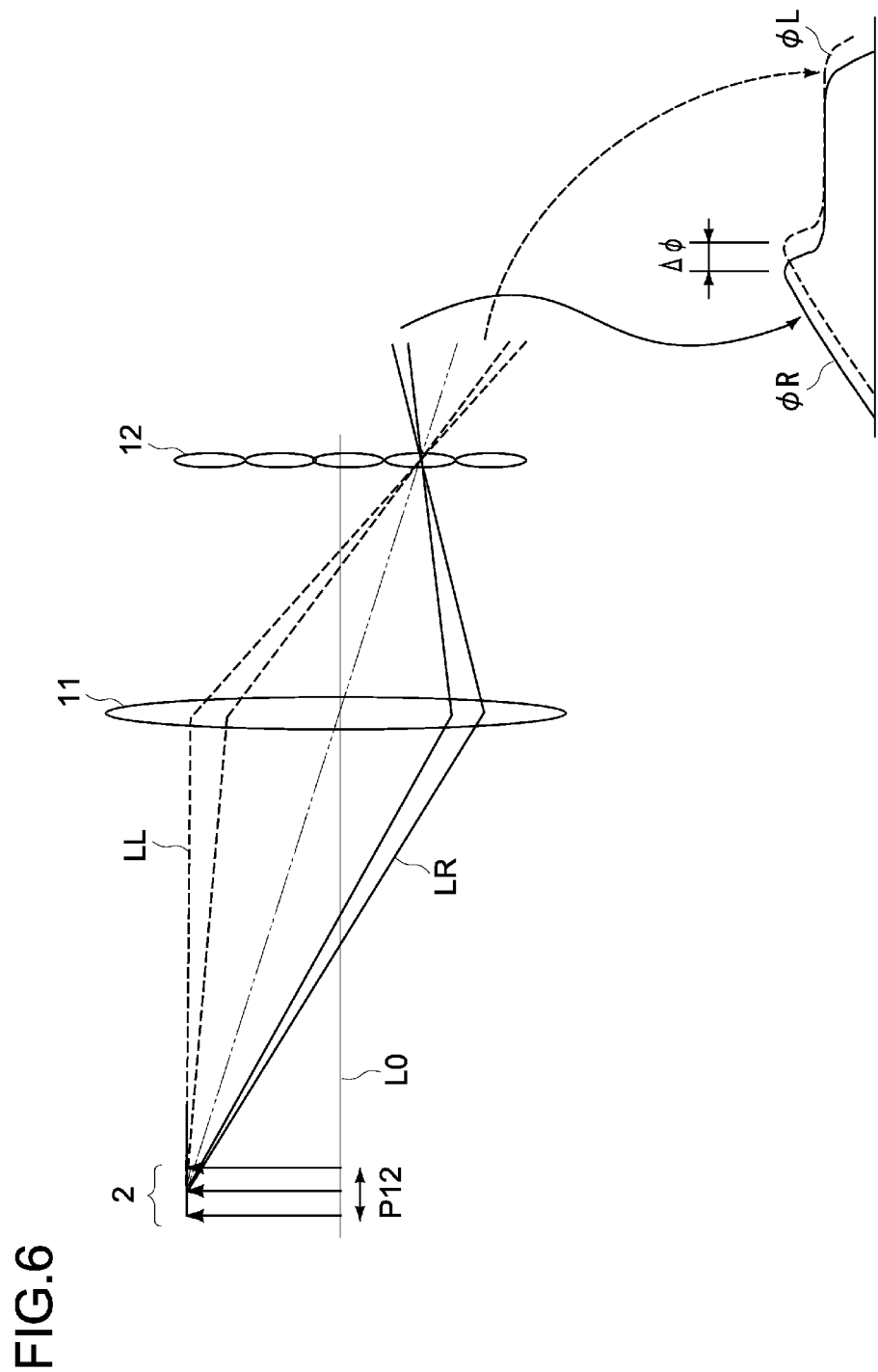
FIG. 6 is a schematic diagram of illustrating a phase difference detection processing.

For example, as shown in FIG. 6, a case where there are two, i.e., right and left, disparity images is taken as an example. A phase difference delta phi between the disparity image formed by the right light beam LR and the disparity image formed by the left light beam LL (a phase difference between a phase phi R of the disparity image formed by the light beam LR and a phase phi L of the disparity image formed by the light beam LL) is detected.

Figure 7:
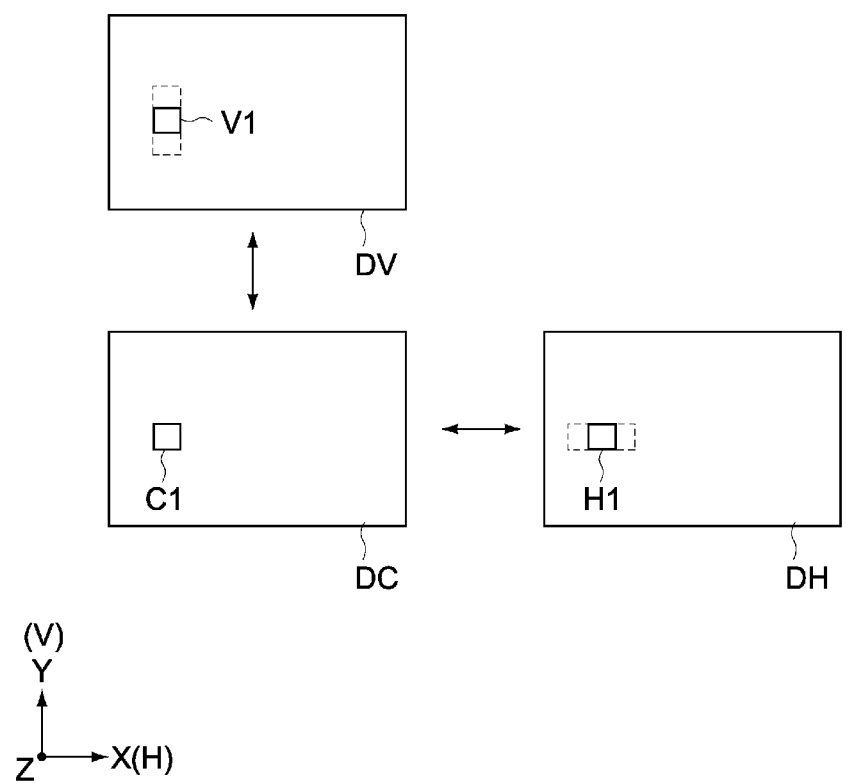
FIG. 7 is a schematic diagram of showing three disparity images used in the phase difference detection processing in the embodiment.

Specifically, according to the embodiment, for example as shown in FIG. 7, the phase difference map DM is generated using a plurality of disparity images (here, three disparity images DC, DH, and DV) along two or more directions different each other (here, two directions of a horizontal (H) direction and a vertical (V) direction within the image). The two disparity images DC and DH have disparity images in the horizontal direction each other. The two disparity images DC and DV have disparity images in the vertical direction each other.

Here, when the phase difference between the two disparity images is generated (the phase difference map DM is generated), the stereo matching technique as described below is, for example, used. In the stereo matching technology, a transfer amount of a substance (the phase difference between the disparity images) is determined by sequentially comparing the two parity images at local areas (by determining a correlation value showing a similarity between the images (a pixel correlation value)).

Specifically, as an example, when the phase difference between the two disparity images DC and DH is determined along the horizontal direction, the phase difference map (DM) is generated as follows: In other words, firstly, the unit area within the one disparity image DC (a partial image C1 in FIG. 7; a central coordinate x1 and y1) is taken to fix the position. Then, the unit area to be compared within the other disparity image DH (a partial image H1 in FIG. 7; a central coordinate x1 and y1) is taken. The position of the partial image H1 is sequentially moved in the horizontal direction within a comparison range H10 to sequentially calculate the correlation values. The position offset (pixel offset) between the partial images C1 and H1 when the correlation is strongest within the comparison range H10 is the phase difference (disparity). By repeating the arithmetic processing of the whole surfaces on the disparity images DC and DH while the position of the partial image C1 is changed, the above-mentioned phase difference map DM (Disparity Map) is provided.

Similarly, when the phase difference between the two disparity images DC and DV is determined along the vertical direction, the phase difference map (DM) is generated as follows: In other words, firstly, the partial image C1 within the disparity image DC and the partial image V1 within the disparity image DV are taken, respectively. The position of the partial image V1 is sequentially moved in the vertical direction within a comparison range V10 to sequentially calculate the correlation values. By repeating the arithmetic processing of the whole surfaces on the disparity images DC and DV while the position of the partial image C1 is changed, the above-mentioned phase difference map DM is generated.

There are a variety of ways to calculate the correlation value. Examples include SAD (Sum of Absolute Difference), SSD (Sum of Squared Difference), NCC (Normalized Cross-Correlation) and the like. When the SAD or SSD has a small value (close to zero), the correlation is strong. When the SAD or SSD has a large value (close to infinite), the correlation is weak. On the other hand, when the NCC has a value close to 1, the correlation is strong. When the NCC has a value close to zero, the correlation is weak.

In this way, according to the present embodiment, the correlation value is calculated on the plurality of disparity images (herein, three disparity images DC, DH, and DV) to detect the phase difference between the disparity images and to generate the phase difference map DM within the image.

In this case, the phase difference is detected separately along two or more directions (herein, along two directions, i.e., the horizontal and vertical directions within the image) that are difference each other. The results of the phase difference detection along respective directions are used to generate the phase difference map DM. Even if the image includes an edge area (a horizontal edge area or a vertical edge area), the edge area less affects the phase difference detection.

Next, in the distance information providing part 143, the distance information calculation portion 143B calculates the predetermined distance information d based on the phase difference map DM determined by the phase difference detection portion 143A. The distance information d herein means information about the distance between the imaging lens 11 and an arbitrary reference position within the captured image corresponding to the captured data D1. Specifically, the distance information d is between the imaging lens 11 and a refocus surface to be in-focused (between the imaging lens 11 and the reference position), which means the focal point at an object side of the imaging lens 11 upon re-focusing as described later.

Figure 8:
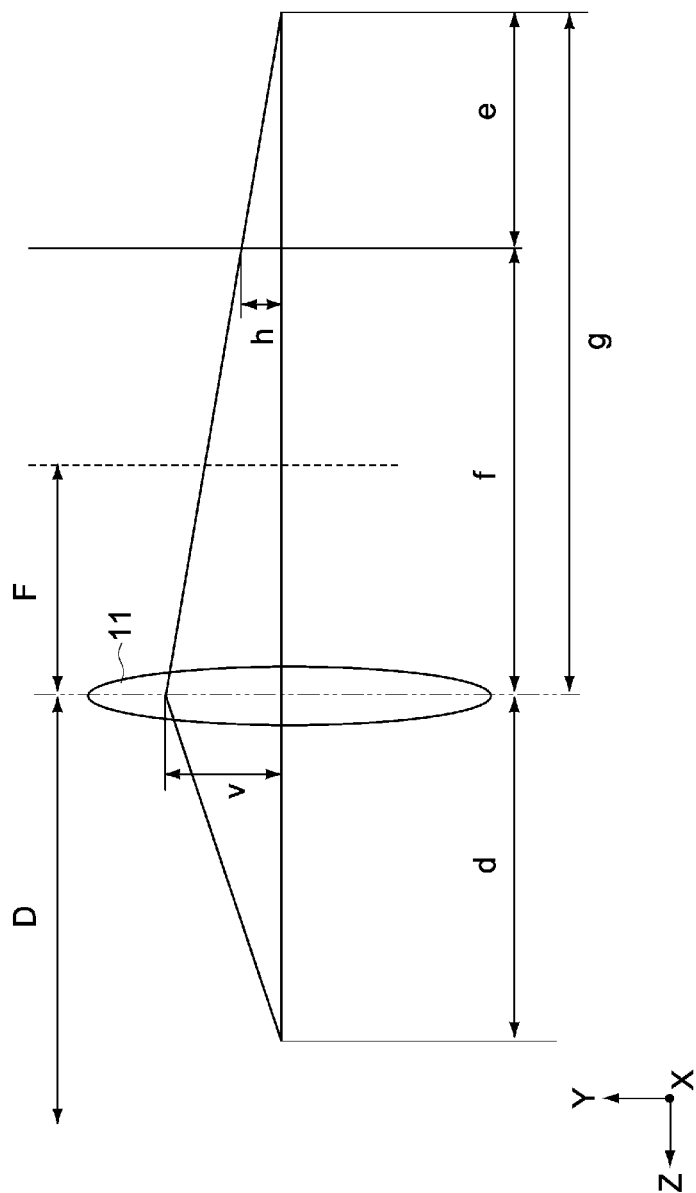
FIG. 8 is a schematic diagram of illustrating a calculation method of a distance between an imaging lens to an object to be measured.

More specifically, the distance information calculation portion 143B calculates the distance d to the object to be measured (distance information d) by the following equations (1) to (8) using the phase difference map DM. As shown in FIG. 8, D denotes a focal plane at the object side of the imaging lens 11, F denotes the focal point of the imaging lens 11, v denotes a size of an opening of the imaging lens when the phase difference map DM is determined, f denotes a focal plane at an image side of the imaging lens 11 when the object is captured at the distance d, g denotes the focal plane at the image side of the imaging lens 11 when the object is captured at the distance d from the imaging lens 11, and h denotes a value calculated by ((disparity)×(size of a pixel P of the image sensor 13)× (numbers of pixels allocated to a length of the microlens array 12) using the v that is the size of the opening of the imaging lens 11.

The following equation (1) is derived from a similarity relationship. As shown in FIG. 8, e=(g−f), which is substituted into the equation (1) to provide the equation (2), thereby providing the equation (3). The image formation equation of the imaging lens 11 provides the equations (4) and (5). By substituting the equation (4) into the equation (3), the equation (6) is provided. The equation (7) is derived from the equation (5). Accordingly, by substituting the equation (7) into the equation (6), the equation (8) is provided. In the equation (8), if the values F, D, and v are known, the distance d is calculated based on the phase difference map DM.

$$(h/e)=(v/g) \tag{1}$$

$$\{h/(g-f)\}=(v/g) \tag{2}$$

$$(1/g)=(1/f)\times\{1-(h/v)\} \tag{3}$$

$$(1/F)=(1/g)+(1/d) \tag{4}$$

$$(1/F)=(1/D)+(1/f) \tag{5}$$

$$(1/d)=(1/F)-[(1/f)\times\{1-(h/v)\}] \tag{6}$$

$$f=F\times\{D/(D-F)\} \tag{7}$$

$$(1/d)=(1/F)-[1/\{F\times D/(D-F)\}\times\{1-(h/v)\}] \tag{8}$$

Next, in the distance information providing part 143, the refocus coefficient setting portion 143C sets (calculates) the refocus coefficient alpha based on the distance information d measured by the distance information calculation portion 143B. Specifically, as shown in FIG. 9A, a case where the image is captured such that the focal plane at the object side of the imaging lens 11 is distant from the image by the distance D is taken as an example. In other words, as shown in FIG. 9B, the refocus coefficient alpha for providing a refocus image on the plane being distant from the imaging lens 11 by the distance d is calculated by the equation (5) above and an equation (9) below. Thus calculated refocus coefficient alpha is input to the sort processing part 144 together with the captured data D1.

$$(1/F) = (1/D) + (1/\text{alpha } f) \qquad (9)$$

Then, the sort processing part 144 implements the predetermined sort processing of the captured data D1 provided by the clamp processing part 142 using the refocus coefficient alpha calculated in the distance information providing part 143 to generate the image data D2. Specifically, the refocus arithmetic processing (integral processing), as described layer, is implemented to generate an image (reconstruction image) at an arbitrary focal point (the refocus plane defined by the refocus coefficient alpha).

Thereafter, the noise reduction part 145 in the image processing unit 14 reduces the noise contained in the thus-generated image data D2. Next, the contour enhancement processing part 146 enhances the contour of the image data after the noise is reduced. Then, the white balance processing part 147 adjusts the color balance (the white balance) of the image data after the contour is enhanced. The gamma correction processing part 148 implements the gamma correction of the image data after the white balance is processed. Thus, the image data Dout is generated and output from the image processing unit 14.

As described above, the image processing unit 14 calculates the correlation values of the plurality of disparity images DC, DH, and DV to detect the phase differences between the disparity images. When the phase difference map DM is generated within the image, the phase differences are detected individually along two directions of the horizontal direction and the vertical direction within the image.

In general, it is known that the shorter the distance between the object and the camera is, the greater the phase difference (disparity) to be detected is, and the longer the distance is, the smaller the phase difference is. In other words, as detection accuracy of the phase difference is changed depending on the distance, the distance information d can be determined accurately at a short distance where the phase difference is great. However, once the phase difference becomes small, there is still a problem that the distance calculation accuracy may be decreased due to a camera noise, a disturbance and the like.

The image processing unit 14 according to the embodiment implements the following processing to decrease the effect of the noise and to be capable of calculating the distance with higher accuracy using a plurality of base lines (distances between light axes).

(Distance Calculation Operation in the Image Processing Unit According to Embodiment)

As described above, in the image processing unit 140 according to the embodiment, the distance information providing part 143 includes the distance information calculation portion 143B. The distance information calculation portion 143B includes the distance information generation portion B1 and the distance extraction portion B2.

The distance information generation portion B1 generates the first distance information about the object to be measured based on the phase difference between the images (a first disparity image group) provided by the camera having the first base length, and the second distance information about the object to be measured based on the phase difference between the images (the second disparity image group) provided by the camera having the second base length being different from the first base length. Here, the object to be measured corresponds to the above-mentioned refocus plane, but is not limited thereto, and may be the object to be imaged 2 by the imaging apparatus 1.

For example, as shown in FIG. 10, a case where a distance Z [mm] between the imaging position (a lens plane of the imaging lens) and the object to be measured 20 using a plurality of (three) cameras CA1, CA2, and CA3 arranged in a uniaxial direction (in a horizontal direction or a vertical direction) is taken as an example. The distance between the light axis of the camera CA1 and that of the camera CA2 is defined as a base length BL1 [mm]. The distance between the light axis of the camera CA2 and that of the camera CA3 is defined as a base length BL2 [mm]. In this case, the base length BL1 and the base length BL2 are set to each have a different length each other.

The base lengths BL1 and BL2 are stored in the memory part 149 of the image processing unit 14. A method of measuring the base lengths BL1 and BL2 will be described later.

The phase difference between the images in the first disparity image group and the phase difference between the images in the second disparity image group are detected in the phase difference detection portion 143A, respectively. The distance information generation portion B1 generates information about the distance Z determined by the respective two disparity image groups.

In other words, as shown in FIG. 11A, the distance information generation portion B1 generates information (first distance information (d1)) about the distance Z to the object to be measured 20. The distance Z is within the range from a distance Z0 [mm] to a distance Z1 [mm]. The first distance information (d1) is generated from the first disparity image group provided by the camera CA1 and the camera CA2 in view of the resolving power of the phase difference detected in the phase difference detection portion 143A as well as the disturbance, the camera noise, the individual differences of the cameras. Similarly, as shown in FIG. 11B, the distance information generation portion B1 generates information (second distance information (d2)) about the distance Z to the object to be measure 20. The distance Z is within the range from a distance Z2 [mm] to a distance Z3 [mm]. The second distance information (d2) is generated from the second disparity image group provided by the camera CA2 and the camera CA3 in view of the resolving power of the phase difference detected in the phase difference detection portion 143A as well as the disturbance, the camera noise, the individual differences of the cameras. Here, Z0<Z2<Z<Z1<Z3.

As shown in FIG. 11C, the distance extraction portion B2 extracts the distance Z between the imaging position and the object to be measured 20 based on the first distance information (d1) and the second distance information (d2). In other words, the distance extraction portion B2 extracts the information about the distance Z to the object to be measured 20 from the first and second distance information (d1 and d2) by utilizing the difference between the base lengths BL1 and BL2.

Since the base length BL1 and the base length BL2 is different, the distance extraction portion B2 extracts the distance Z to the object to be measured 20 within a mutually overlapped distance range (Z2<Z<Z1) in a first distance range (Z0<=Z<=Z1) extracted from the first distance information and a second distance range (Z2<Z<Z3) extracted from the second distance information. In the embodiment, such a processing is called as a base line calibration.

In the embodiment, the distance Z to the object to be measured 20 is calculated using the viewpoint images from the three cameras having different base lengths (base lines) each other. The detection accuracy of the distance Z can be further enhanced by using four or more cameras. According to the embodiment, the distance accuracy of the object to be measured 20 can be enhanced as compared with that obtained by using one base line.

FIG. 12 shows an example of a flow chart of calculating the distance using the plurality of cameras. This embodiment shows that extraction processing (each of steps ST11, ST12, and ST13) of the distance information to the object to be measured 20 is implemented in parallel based on the first disparity image group, the second disparity image group the Nth (where N is a natural number of 3 or more) disparity image group. Then, a base line calibration processing (step S14) is implemented to integrate multiple pieces of the distance information provided by the extraction processing.

In the baseline calibration, any appropriate arithmetic techniques may be applied. For example, the distance Z may be determined by averaging the distance range about the object to be measured 20 extracted from each of the disparity image groups. Alternatively, the predetermined distance information among the plurality of distance ranges extracted may be weighted.

(Method of Measuring Base Length)

Next, a method of measuring the base length will be described. For the measurement of the base length, an object to be measured 30 having a texture that a disparity can be accurately calculated is used, for example, as shown in FIG. 13. After the object to be measured 30 is located at a position known by the imaging apparatus 1, disparity values about a plurality of viewpoint images are calculated.

Figure 14:
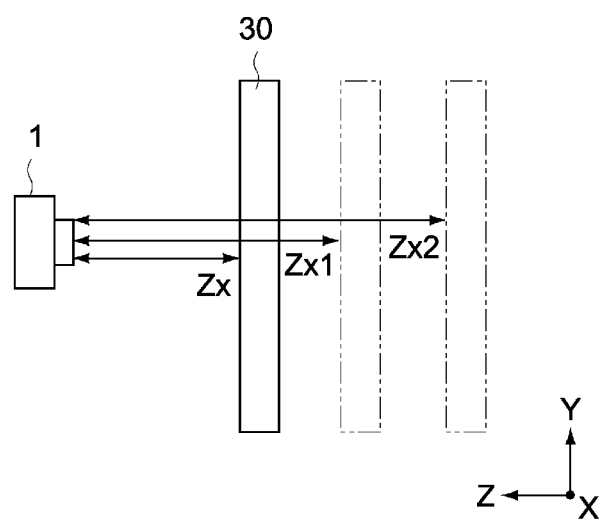
FIG. 14 is a schematic diagram of illustrating the method of measuring the base length in the image processing unit.

Upon the measurement of the disparity, the base length (corresponds to "v" in FIG. 8) can be calculated by substituting the disparity values calculated into the above-described equations (1) to (8). In addition, as shown in FIG. 14, the distance between the imaging apparatus 1 and the object to be measured 30 is sequentially changed as Zx, Zx1, and Zx2, and the disparity values are calculated repeatedly, thereby calculating the base length more accurately. The base length thus obtained is stored in the memory part 149, and is used for the base line calibration processing.

A selection of the plurality of the parity image groups having different disparities (or a plurality of camera groups having different base lengths) is not limited to a combination of the first disparity image group provided by the camera CA1 and the camera CA2 and the second disparity image group provided by the camera CA2 and camera CA3. For example, a combination of the first disparity image group provided by the camera CA1 and the camera CA2 and the second disparity image group provided by the camera CA1 and the camera CA3.

Typically, the microlens array 12 is designed to arrange respective microlenses at regular intervals in a biaxial direction. In fact, the respective microlenses have different but minor base lengths due to a design tolerance of a mold or the like. Accordingly, it is possible to effectively use the disparity images provided by two microlenses adjacent each other for the generation of the distance information.

The microlens array 12 is designed to be arranged in parallel with the light receiving surface of the image sensor 13. In fact, the respective microlenses have different but minor base lengths due to an alignment offset. In this case, it is possible to effectively use such an offset amount for the generation of the distance information.

As described above, according to the embodiment, it is possible to calculate the distance to the object to be measured more accurately. Therefore, the observed image at an arbitrary focal point or from any view point can be reconstructed with high precision. In addition, a movement and a transfer amount in a depth (Z axis) direction of the object to be measured can be determined with high precision. Therefore, the imaging apparatus 1 can be used as a user interface such as a gesture input and the like.

Although the embodiments of the present technology have been described, it should be understood by those skilled in the art that various modifications, combinations, sub-combinations and alterations may occur depending on design requirements and other factors insofar as they are within the scope of the appended claims or the equivalents thereof.

Although, for example, the imaging apparatus 1 having the microlens array 12 has been described in the embodiment, the present technology is applicable to an imaging apparatus having a plurality of camera units arranged two-dimensionally. Such a configuration can provide the plurality of viewpoint images about the object to be measured at the same time.

Also, optical sensors that can divide light beams such as a liquid crystal lens array, a liquid lens array, a diffraction lens array and the like in place of the microlens array 12.

Although the embodiment has been described by illustrating the image processing unit 14 mounted on the imaging apparatus, but is not limited thereto, and the image processing unit may be configured with an information processing apparatus such as a PC (Personal Computer) terminal and the like. In this case, the distance information about the object to be measured can be calculated using the above-described techniques by receiving a plurality of view point image data provided by a multi-view camera with wired or wireless connections.

The present technology may have the following configurations.

(1) An image processing apparatus, including:

a distance information generation portion that generates first distance information about an object to be measured based on a phase difference between images provided by a camera having a first base length, and second distance information about the object to be measured based on a phase difference between images provided by a camera having a second base length being different from the first base length; and a distance extraction portion that extracts a distance between an imaging position and the object to be measured based on the first and second distance information.

(2) The image processing apparatus according to (1) above, in which the distance extraction portion extracts a distance to the object to be measured within a mutually overlapped distance range in a first distance range extracted from the first distance information and a second distance range extracted from the second distance information.

(3) The image processing apparatus according to (1) or (2) above, further including:
a memory part for storing the first and second base lengths.

(4) The image processing apparatus according to any one of (1) to (3) above, in which
the distance information generation portion further generates third distance information about the object to be measured based on a phase difference between images provided by a camera having a third base length being different from the first and the second base lengths, and
the distance extraction portion extracts a distance between the imaging position and the object to be measured based on the first, second, and third distance information.

(5) An imaging apparatus, including:
an imaging unit including a plurality of cameras arranged in a uniaxial direction,
a distance information generation portion that generates first distance information about an object to be measured based on a phase difference between images provided by a camera having a first base length, and second distance information about the object to be measured based on a phase difference between images provided by a camera having a second base length being different from the first base length, and
a distance extraction portion that extracts a distance between an imaging position and the object to be measured.

(6) The imaging apparatus according to (5) above, in which
the imaging unit includes an imaging lens having an aperture stop, an image sensor for providing captured data based on a received light, and a plurality of microlenses disposed corresponding to a plurality of pixels in one area of the image sensor between the imaging lens and the image sensor.

(7) An image processing method, including:
producing first distance information about an object to be measured based on a phase difference between images provided by a camera having a first base length,
producing second distance information about the object to be measured based on a phase difference between images provided by a camera having a second base length being different from the first base length, and
extracting a distance between an imaging position and the object to be measured based on the first and second distance information.

(8) An image processing apparatus comprising:
a distance information generation portion configured to
generate first distance information about an object to be measured based on a phase difference between images provided by a plurality of first cameras having a first base length, and
generate second distance information about the object to be measured based on a phase difference between images provided by a plurality of second cameras having a second base length that is different from the first base length; and
a distance extraction portion configured to extract distance information from an imaging position and the object to be measured based on the first distance information and the second distance information.

(9) The image processing apparatus according to (8), wherein each of the first and second cameras include a combination of one microlens of a microlens array and a portion of a light-receiving area of an image sensor, wherein each microlens corresponds to a different light-receiving area of the image sensor.

(10) The image processing apparatus according to (9), further comprising a distance information providing part including:
a distance information calculation portion including the distance information generation portion and the distance extraction portion, and
a phase difference detection portion that is configured to generate a phase difference map based on captured image data of the image sensor.

(11) The image processing apparatus according to (10), further comprising a sort processing part,
wherein the distance information providing part is configured to calculate a refocus coefficient alpha that is used for sort processing in the sort processing part of the image processing apparatus, and is configured to calculate the refocus coefficient alpha using a depth of a designated captured image of the image sensor corresponding to captured data as a refocus surface of the object to be measured.

(12) The image processing apparatus according to (11), further comprising a clamp processing part configured to set a black level in pixel data of the captured data of the image sensor,
wherein the sort processing part is configured to implement a predetermined sort processing of the captured data provided by the clamp processing part using the refocus coefficient alpha calculated to generate image data.

(13) The image processing apparatus according to (10), wherein the distance information calculation portion further includes a refocus coefficient setting part that is configured to calculate a refocus coefficient alpha, from distance information from an imaging position to a refocus surface of an object to be measured based on the phase difference map.

(14) The image processing apparatus according to (10),
wherein each light-receiving area of the image sensor corresponds to a different unit image, and each unit image includes an array of pixels, and
wherein the phase difference detection portion is configured to generate a plurality of disparity images based on the captured image data, each disparity image for detecting the phase differences being generated by extracting and combining pixel data from a given pixel within the array of pixels for each unit image, the given pixels being disposed at the same relative position within the array of pixels for each unit image.

(15) The image processing apparatus according to (14), wherein the number of the disparity images generated are equal to the number of pixels in each unit image.

(16) The image processing apparatus according to (14), wherein the phase difference map is generated based on the plurality of disparity images and indicates phase differences per unit area.

(17) The image processing apparatus according to (8), wherein the distance extraction portion extracts the distance to the object to be measured within a mutually overlapped distance range in a first distance range extracted from the first distance information and a second distance range extracted from the second distance information.

(18) The image processing apparatus according to (8), further comprising a defect correction part configured to correct a defect attributed to an abnormality of the image sensor.

(19) The image processing apparatus according to (18), further comprising a clamp processing part configured to set a black level in pixel data of the captured data of the image sensor after any defect correction is performed by the defect correction part.

(20) The image processing apparatus according to (8), further comprising a memory part for storing the first and second base lengths.

(21) The image processing apparatus according to (8), wherein the distance information generation portion is further configured to generate third distance information about the object to be measured based on a phase difference between images provided by a third camera having a third base length being different from the first based lengths and the second base lengths, and wherein the distance extraction portion is further configured to extract a distance between the imaging position and the object to be measured based on the first, second, and third distance information.

(22) An imaging apparatus comprising:

an image sensor; and an image processing apparatus including a distance information generation portion configured to generate first distance information about an object to be measured based on a phase difference between images provided by a plurality of first cameras having a first base length, and generate second distance information about the object to be measured based on a phase difference between images provided by a plurality of second cameras having a second base length that is different from the first base length, and a distance extraction portion configured to extract distance information from an imaging position of the image sensor and the object to be measured based on the first distance information and the second distance information.

(23) The image apparatus according to (22), wherein each of the first and second cameras include a combination of one microlens of a microlens array and a portion of a light-receiving area of the image sensor, wherein each microlens corresponds to a different light-receiving area of the image sensor.

(24) The image apparatus according to (23), further comprising a distance information providing part including:

a distance information calculation portion including the distance information generation portion and the distance extraction portion, and a phase difference detection portion that is configured to generate a phase difference map based on captured image data of the image sensor.

(25) The image apparatus according to (24), further comprising a sort processing part, wherein the distance information providing part is configured to calculate a refocus coefficient alpha that is used for sort processing in the sort processing part of the image processing apparatus, and is configured to calculate the refocus coefficient alpha using a depth of a designated captured image of the image sensor corresponding to captured data as a refocus surface of the object to be measured.

(26) The image apparatus according to (25), further comprising a clamp processing part configured to set a black level in pixel data of the captured data of the image sensor, wherein the sort processing part is configured to implement a predetermined sort processing of the captured data provided by the clamp processing part using the refocus coefficient alpha calculated to generate image data.

(27) The image processing apparatus according to (24), wherein the distance information calculation portion further includes a refocus coefficient setting part that is configured to calculate a refocus coefficient alpha, from distance information from an imaging position to a refocus surface of an object to be measured based on the phase difference map.

(28) The image apparatus according to (24), wherein each light-receiving area of the image sensor corresponds to a different unit image, and each unit image includes an array of pixels, and wherein the phase difference detection portion is configured to generate a plurality of disparity images based on the captured image data, each disparity image for detecting the phase differences being generated by extracting and combining pixel data from a given pixel within the array of pixels for each unit image, the given pixels being disposed at the same relative position within the array of pixels for each unit image.

(29) The image apparatus according to (28), wherein the number of the disparity images generated are equal to the number of pixels in each unit image.

(30) The image apparatus according to (28), wherein the phase difference map is generated based on the plurality of disparity images and indicates phase differences per unit area.

(31) The image apparatus according to (22), wherein the distance extraction portion extracts the distance to the object to be measured within a mutually overlapped distance range in a first distance range extracted from the first distance information and a second distance range extracted from the second distance information.

(32) The image apparatus according to (22), further comprising a defect correction part configured to correct a defect attributed to an abnormality of the image sensor.

(33) The image apparatus according to (32), further comprising a clamp processing part configured to set a black level in pixel data of the captured data of the image sensor after any defect correction is performed by the defect correction part.

(34) The imaging apparatus according to (22), further comprising a memory part for storing the first and second base lengths.

(35) The imaging apparatus according to (22), wherein the distance information generation portion is further configured to generate third distance information about the object to be measured based on a phase difference between images provided by a third camera having a third base length being different from the first based lengths and the second base lengths, and wherein the distance extraction portion is further configured to extract a distance between the imaging position and the object to be measured based on the first, second, and third distance information.

(36) An image processing method comprising:

generating first distance information about an object to be measured based on a phase difference between images provided by a plurality of first cameras having a first base length, generating second distance information about the object to be measured based on a phase difference between images provided by a plurality of second cameras having a second base length that is different from the first base length; and extracting distance information from an imaging position and the object to be measured based on the first distance information and the second distance information.

(37) The method according to (36), wherein each of the first and second cameras include a combination of one microlens of a microlens array and a portion of a light-receiving area of an image sensor, wherein each microlens corresponds to a different light-receiving area of the image sensor.

(38) The method according to (37), further comprising generating a phase difference map based on captured image data of the image sensor.

(39) The method according to (38), further:
calculating a refocus coefficient alpha that is used for sort processing by using a depth of a designated captured image of the image sensor corresponding to captured data as a refocus surface of the object to be measured.

(40) The method according to (39), further comprising:
setting a black level in pixel data of the captured data of the image sensor, and
implementing a predetermined sort processing of the captured data using the refocus coefficient alpha calculated to generate image data.

(41) The method according to (38), further comprising:
calculating a refocus coefficient alpha, from distance information from an imaging position to a refocus surface of an object to be measured based on the phase difference map.

(42) The method according to (38), wherein each light-receiving area of the image sensor corresponds to a different unit image, and each unit image includes an array of pixels, the method further comprising:
generating a plurality of disparity images based on the captured image data, each disparity image for detecting the phase differences being generated by extracting and combining pixel data from a given pixel within the array of pixels for each unit image, the given pixels being disposed at the same relative position within the array of pixels for each unit image.

(43) The method according to (42), wherein the number of the disparity images generated are equal to the number of pixels in each unit image.

(44) The image processing apparatus according to (42), wherein the phase difference map is generated based on the plurality of disparity images and indicates phase differences per unit area.

(45) The method according to (36), wherein extracting the distance information is performed by extracting within a mutually overlapped distance range in a first distance range extracted from the first distance information and a second distance range extracted from the second distance information.

(46) The method according to (37), further comprising correcting a defect attributed to an abnormality of the image sensor.

(47) The method according to (46), further comprising setting a black level in pixel data of the captured data of the image sensor after any defect correction is performed.

(48) The method according to (32), further comprising storing the first and second base lengths in a memory.

(49) The method according to (32), further comprising:
generating third distance information about the object to be measured based on a phase difference between images provided by a third camera having a third base length being different from the first based lengths and the second base lengths, and
extracting a distance between the imaging position and the object to be measured based on the first, second, and third distance information.

The present application contains subject matter related to that disclosed in Japanese Priority Patent Application JP 2012-145036 filed in the Japan Patent Office on Jun. 28, 2012, the entire content of which is hereby incorporated by reference.

REFERENCE SIGNS LIST 1 imaging apparatus
2 object to be imaged
11 imaging lens
12 microlens array
13 image sensor
14 image processing unit
20 object to be measured
143 distance information providing part
143B distance information calculation portion
149 memory part
B1 distance information generation portion
B2 distance extraction portion.

The invention claimed is:
1. An image processing apparatus, comprising:
memory configured to store instructions; and
a computer configured to execute the instructions to:
generate first distance information of an object, based on a first phase difference between a first image from a first camera and a second image from a second camera;
generate second distance information of the object, based on a second phase difference between the second image and a third image from a third camera;
determine a first distance between an imaging position and the object, based on the first distance information and the second distance information,
wherein a first base length between a first light axis of the first camera and a second light axis of the second camera is different from a second base length between the second light axis of the second camera and a third light axis of the third camera;
calculate, based on the first distance, a refocus coefficient;
sort first image data of an image sensor based on the refocus coefficient,
wherein the first image data is associated with each of the first image, the second image and the third image;
generate second image data at a refocus surface based on the sorted first image data,
wherein the second image data corresponds to the refocus surface of the object; and
process the second image data to generate third image data as an output image.

2. The image processing apparatus according to claim 1, wherein the computer is further configured to determine the first distance within an overlapped distance range, and
wherein the overlapped distance range corresponds to an overlap region between a first distance range extracted from the first distance information and a second distance range extracted from the second distance information.

3. The image processing apparatus according to claim 1, wherein the computer is further configured to correct a defect attribute, and
wherein the defect attribute corresponds to an abnormality of the image sensor.

4. The image processing apparatus according to claim 3, wherein the computer is further configured to set a black level in pixel data corresponding to the first image data of the image sensor, based on the correction of the defect attribute.

5. The image processing apparatus according to claim 1, wherein the memory is further configured to store the first base length and the second base length.

6. The image processing apparatus according to claim 1, wherein the computer is further configured to:

generate third distance information of the object, based on a third phase difference between the third image and a fourth image from a fourth camera, wherein a third base length between the third light axis of the third camera and a fourth light axis of the fourth camera is different from each of the first base length and the second base length; and determine a second distance between the image position and the object, based on the first distance information, the second distance information, and the third distance information.

7. An image apparatus, comprising:

an image sensor; and an image processing apparatus, comprising:

memory configured to store instructions; and a computer configured to execute the instructions to:

generate first distance information of an object, based on a first phase difference between first images from a plurality of first cameras;

generate second distance information of the object, based on a second phase difference between second images from a plurality of second cameras;

determine a first distance between an imaging position of the image sensor and the object, based on the first distance information and the second distance information, wherein a first base length between a first light axis of a third camera of the plurality of first cameras and a second light axis of a fourth camera of the plurality of first cameras is different from a second base length between a third light axis of a fifth camera of the plurality of second cameras and a fourth light axis of a sixth camera of the plurality of second cameras;

calculate, based on the first distance, a refocus coefficient;

sort first image data of the image sensor based on the refocus coefficient, wherein the first image data is associated with each of the first images and the second images;

generate second image data at a refocus surface based on the sorted first image data, wherein the second image data corresponds to the refocus surface of the object; and process the second image data to generate third image data as an output image.

8. The imaging apparatus according to claim 7, wherein each of the plurality of first cameras and each of the plurality of second cameras comprises a combination of one microlens of a microlens array and a portion of a light-receiving area of the image sensor, and wherein each microlens of the microlens array corresponds to a different light-receiving area of the image sensor.

9. The imaging apparatus according to claim 8, wherein the computer is further configured to generate a phase difference map based on the first image data of the image sensor.

10. The imaging processing apparatus according to claim 9, wherein the computer is further configured to calculate the refocus coefficient, based on third distance information from the imaging position to the refocus surface of the object and the phase difference map.

11. The imaging apparatus according to claim 9, wherein each light-receiving area of the image sensor corresponds to a different unit image, and each unit image comprises an array of pixels, wherein the computer is further configured to:

generate a plurality of disparity images based on the first image data; and detect the first phase difference and the second phase difference, based on extraction and combination of pixel data from a first pixel and a second pixel within the array of pixels, for each unit image, wherein the first pixel and the second pixel are at a same relative position within the array of pixels, for each unit image.

12. The imaging apparatus according to claim 11, wherein a first number of the plurality of disparity images is equal to a second number of pixels in each unit image, and wherein the computer is further configured to generate the phase difference map that indicates phase difference per unit area, based on the plurality of disparity images.

13. The imaging apparatus according to claim 7, wherein the computer is further configured to set a black level in pixel data corresponding to the first image data of the image sensor.

14. The imaging apparatus according to claim 7, wherein the computer is further configured to determine the first distance within an overlapped distance range, and wherein the overlapped distance range corresponds to an overlap region between a first distance range extracted from the first distance information and a second distance range extracted from the second distance information.

15. The imaging apparatus according to claim 7, wherein the computer is further configured to correct a defect attribute, and wherein the defect attribute corresponds to an abnormality of the image sensor.

16. The imaging apparatus according to claim 15, wherein the computer is further configured to set a black level in pixel data corresponding to the first image data of the image sensor, based on the correction of the defect attribute.

17. The imaging apparatus according to claim 7, wherein the memory is further configured to store the first base length and the second base length.

18. An image processing apparatus, comprising:

memory configured to store instructions; and a computer configured to execute the instructions to:

generate first distance information of an object, based on a first phase difference between a first image from a first camera and a second image from a second camera;

generate second distance information of the object, based on a second phase difference between a third image from a third camera and a fourth image from a fourth camera;

determine a first distance between an imaging position and the object, based on the first distance information and the second distance information, wherein a first base length is between a light axis of the first camera and the second camera, wherein a second base length is between the light axis of the third camera and the fourth camera, and wherein the first base length between a first light axis of the first camera and a second light axis of the second camera is different from the second base length between a third light axis of the third camera and a fourth light axis of the fourth camera;

calculate, based on the first distance, a refocus coefficient;

sort first image data of an image sensor based on the refocus coefficient,
wherein the first image data is associated with each of the first image, the second image, the third image and the fourth image;
generate second image data at a refocus surface based on the sorted first image data,
wherein the second image data corresponds to the refocus surface of the object; and
process the second image data to generate third image data as an output image.

* * * * *